United States Patent
Alameh et al.

(10) Patent No.: US 9,503,617 B2
(45) Date of Patent: Nov. 22, 2016

(54) ELECTRONIC DEVICE WITH FLEXIBLE HOUSING PORTION AND RELATED METHOD

(71) Applicant: Motorola Mobility LLC, Chicago, IL (US)

(72) Inventors: Rachid M Alameh, Crystal Lake, IL (US); William S Hede, Lake in the Hills, IL (US); Jiri Slaby, Buffalo Grove, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/276,112

(22) Filed: May 13, 2014

(65) Prior Publication Data

US 2015/0334274 A1    Nov. 19, 2015

(51) Int. Cl.
*H04N 5/225* (2006.01)
*H04N 5/232* (2006.01)
*G03B 17/56* (2006.01)

(52) U.S. Cl.
CPC ............ *H04N 5/225* (2013.01); *H04N 5/2251* (2013.01); *H04N 5/2252* (2013.01); *H04N 5/232* (2013.01); *H04N 5/23245* (2013.01); *H04N 5/23296* (2013.01); *G03B 17/563* (2013.01); *G06F 2203/04102* (2013.01)

(58) Field of Classification Search
CPC .... G03B 17/563; G03B 17/02; A45C 11/38; A45F 2200/055; H04M 2250/52; H04N 5/2252

USPC .................. 348/376–376; 455/575.1, 575.8
See application file for complete search history.

(56) References Cited

U.S. PATENT DOCUMENTS

| | | | |
|---|---|---|---|
| 6,741,189 B1 * | 5/2004 | Gibbons et al. ................ 341/31 |
| 7,188,989 B2 * | 3/2007 | Miyashita ..................... 362/621 |
| 8,337,065 B2 * | 12/2012 | Huang .......................... 362/612 |
| 2008/0179173 A1 * | 7/2008 | Jung et al. .................... 200/314 |
| 2011/0261002 A1 * | 10/2011 | Verthein ................ G06F 1/181 345/174 |
| 2015/0008114 A1 * | 1/2015 | Jung ..................... H01H 13/83 200/517 |
| 2015/0195926 A1 * | 7/2015 | Kandur Raja ........ G06F 1/1605 348/373 |
| 2015/0331542 A1 * | 11/2015 | Alameh ................. G01J 1/044 345/175 |

* cited by examiner

*Primary Examiner* — Ngoc-Yen Vu
(74) *Attorney, Agent, or Firm* — Morris & Kamlay LLP

(57) ABSTRACT

The disclosure is directed to an electronic device having an internal light source that emits light along a path through the housing. The housing has at least one flexible portion which, when subjected to external pressure flexes, thereby altering the path of the light. A processor receives a signal (from a light sensor receiver) indicating a change in the light and reacts by initiating a function of the device. The particular function that the processor initiates may depend on the mode that the device is currently in. For example, if the device is not currently in a camera mode, then the processor may launch a camera function. If the device is in a camera mode, then the processor may control the zoom of an imager. If the device is in a camera mode and is also motionless, then the processor may cause the imager to capture an image.

15 Claims, 9 Drawing Sheets

ELECTRONIC DEVICE WITH FLEXIBLE HOUSING PORTION AND RELATED METHOD

TECHNICAL FIELD

The present disclosure relates to electronic devices with housings that have flexible portions.

BACKGROUND

Manufacturers of mobile electronics such as cell phones and tablet computers face many challenges in their efforts to keep their manufacturing costs low, to minimize the size of the devices compact, and to differentiate their products from those of their competitors. Among these challenges is minimizing the number of moving parts on the device. One notable effort in this regard has been the trend toward replacing physical buttons with virtual buttons through the use of touch sensors—either on the display or on some other part of the device. A common complaint about such virtual keys, however, is that it is very easy for them to be pressed accidentally, even when the user's hand is nowhere near the device. This often occurs as a result of the device bouncing around in the user's pocket or purse.

DRAWINGS

While the appended claims set forth the features of the present techniques with particularity, these techniques may be best understood from the following detailed description taken in conjunction with the accompanying drawings of which:

Figure 5:
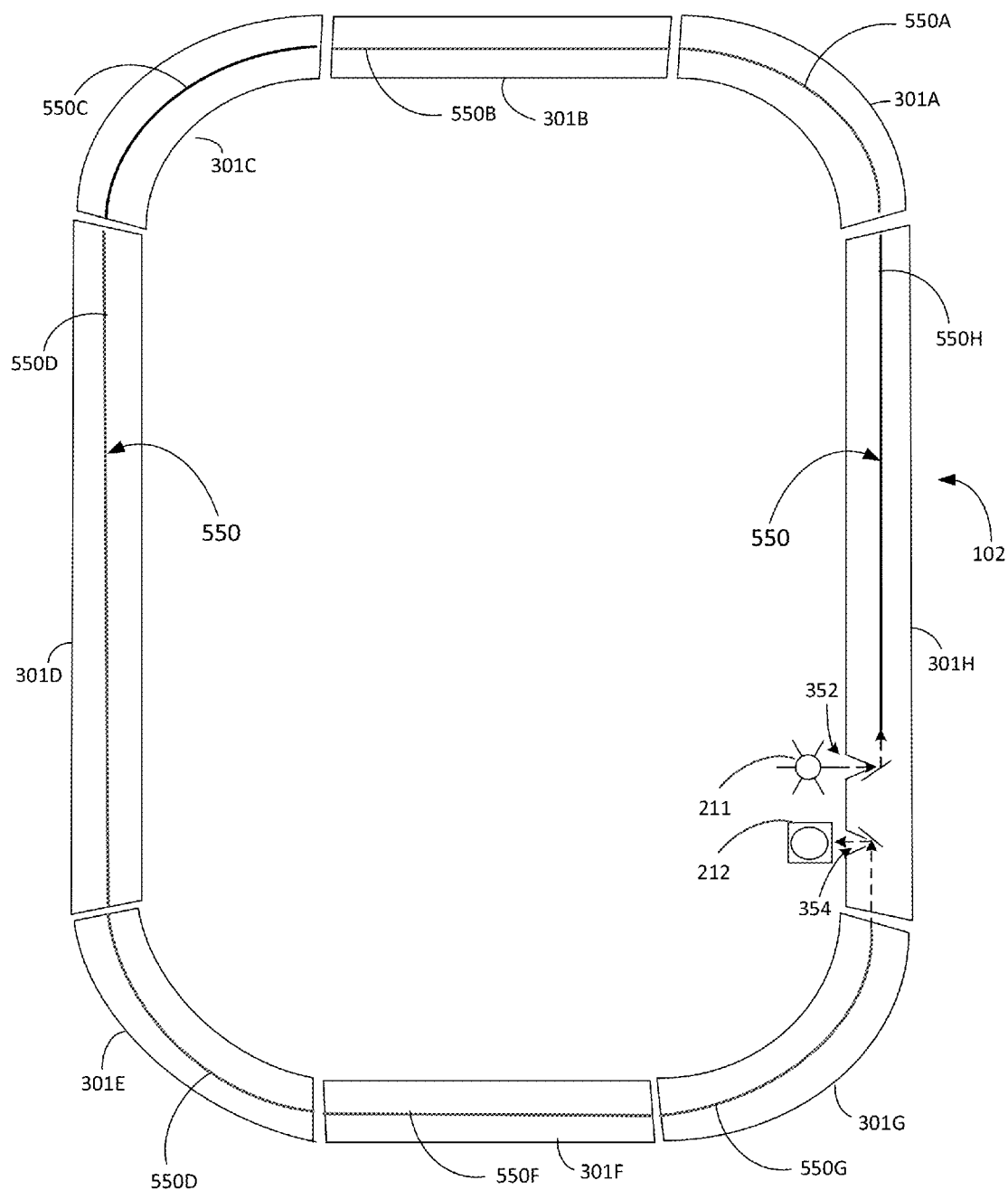
Figure 7:
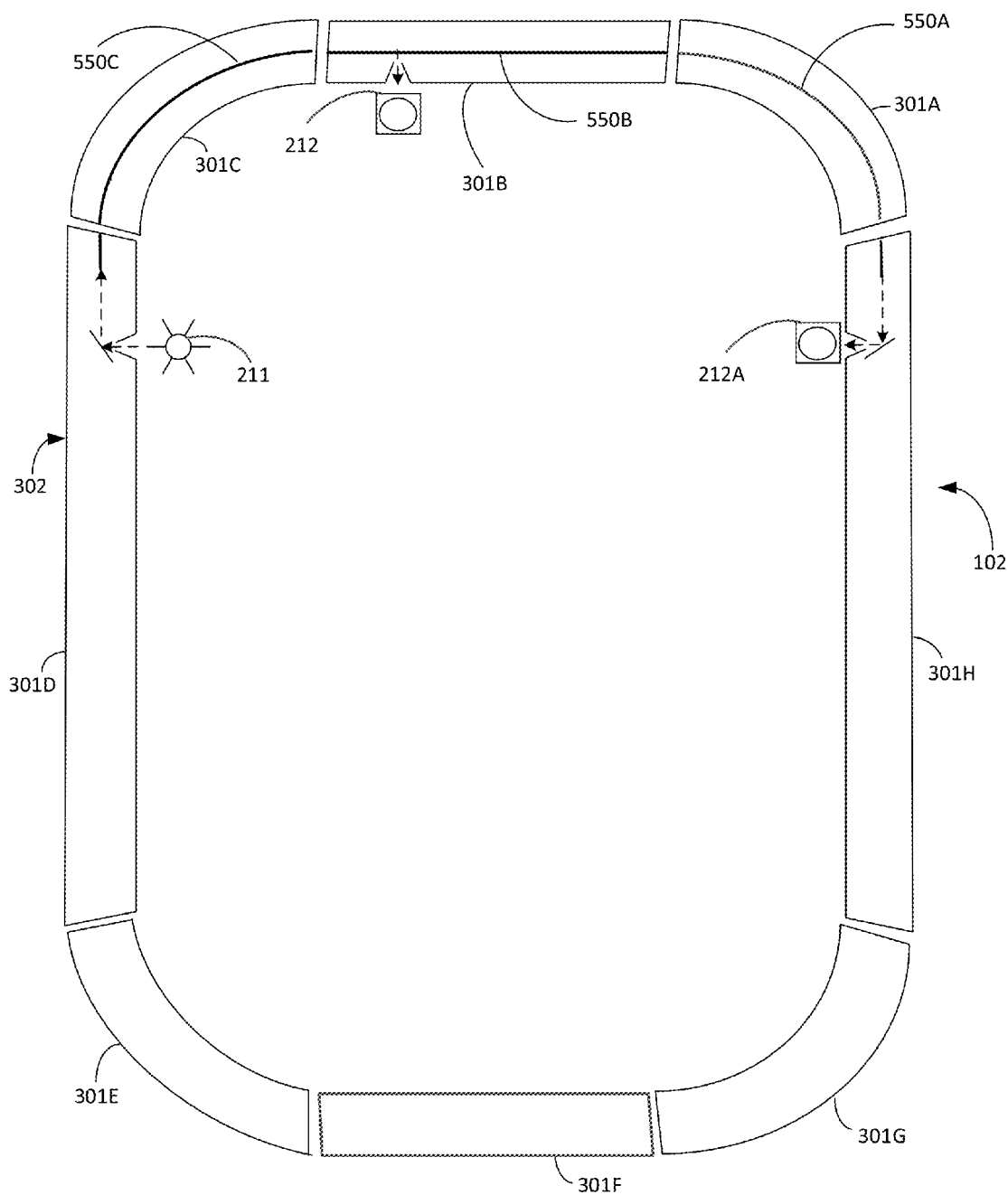
Figure 8:
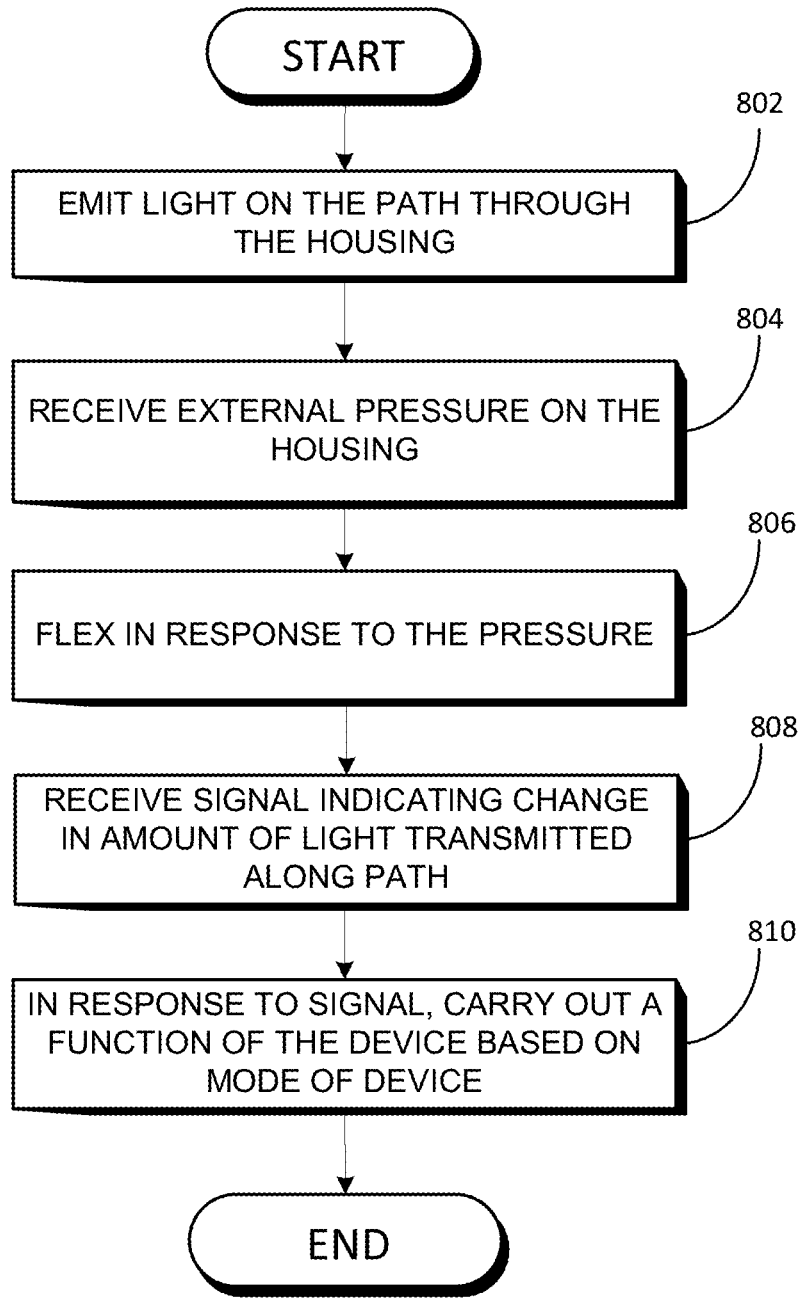

FIG. 4A, FIG. 4B, FIG. 4C, and FIG. 4D are block diagrams showing different embodiments of a flexible portion of the housing of the electronic device;

FIG. 5 is a block diagram showing a configuration of a conduit through flexible portions of the housing of the electronic device according to an embodiment;

FIG. 6A, FIG. 6B, FIG. 6C, and FIG. 6D are block diagrams showing different embodiments of a flexible portion of the housing of the electronic device;

FIG. 7 is a block diagram showing a configuration of a conduit through flexible portions of the housing of the electronic device according to an embodiment; and FIG. 8 is a process flow diagram showing a procedure carried out by the electronic device in an embodiment.

DESCRIPTION

The disclosure is directed to an electronic device ("device") having an internal light source that emits light along a path through the housing. The housing has at least one flexible portion which, when subjected to external pressure, flexes (e.g., flexes internally or flexes relative to the rest of the housing), thereby altering the path of the light. A light receiver sensor along or near the path detects the change in the amount of light being transmitted along the path and, in response to the change, produces a signal. A processor receives the signal and reacts by initiating a function of the device. The particular function that the processor initiates may depend on the mode that the device is currently in.

For example, if the device is not currently in a camera mode, then the processor may react by launching a camera function (e.g., executing a camera application or putting the device into a camera mode). If the device is already in a camera mode, then the processor may react by carrying out a camera function, such as taking a still photo. Thus, to take a picture from start to finish, the user would only need to squeeze the device (which would put the device into camera mode), aim, and then squeeze the device again (which would take the photo). The processor may also react based on the detected motion of the device (e.g., based on accelerometer data). For example, the first squeeze by the user could be interpreted as a "camera launch" input, to which the processor would react by launching a camera application; the second squeeze could be interpreted as a zoom command, to which the processor would react by controlling the zoom function of an imager of the device; and the third squeeze could be interpreted as a shutter release command if the device was detected as being motionless. In effect, the flexible portion of the housing (which may be implemented as a ring around the perimeter of the housing) could act as a single, multifunction button.

Figure 1A:
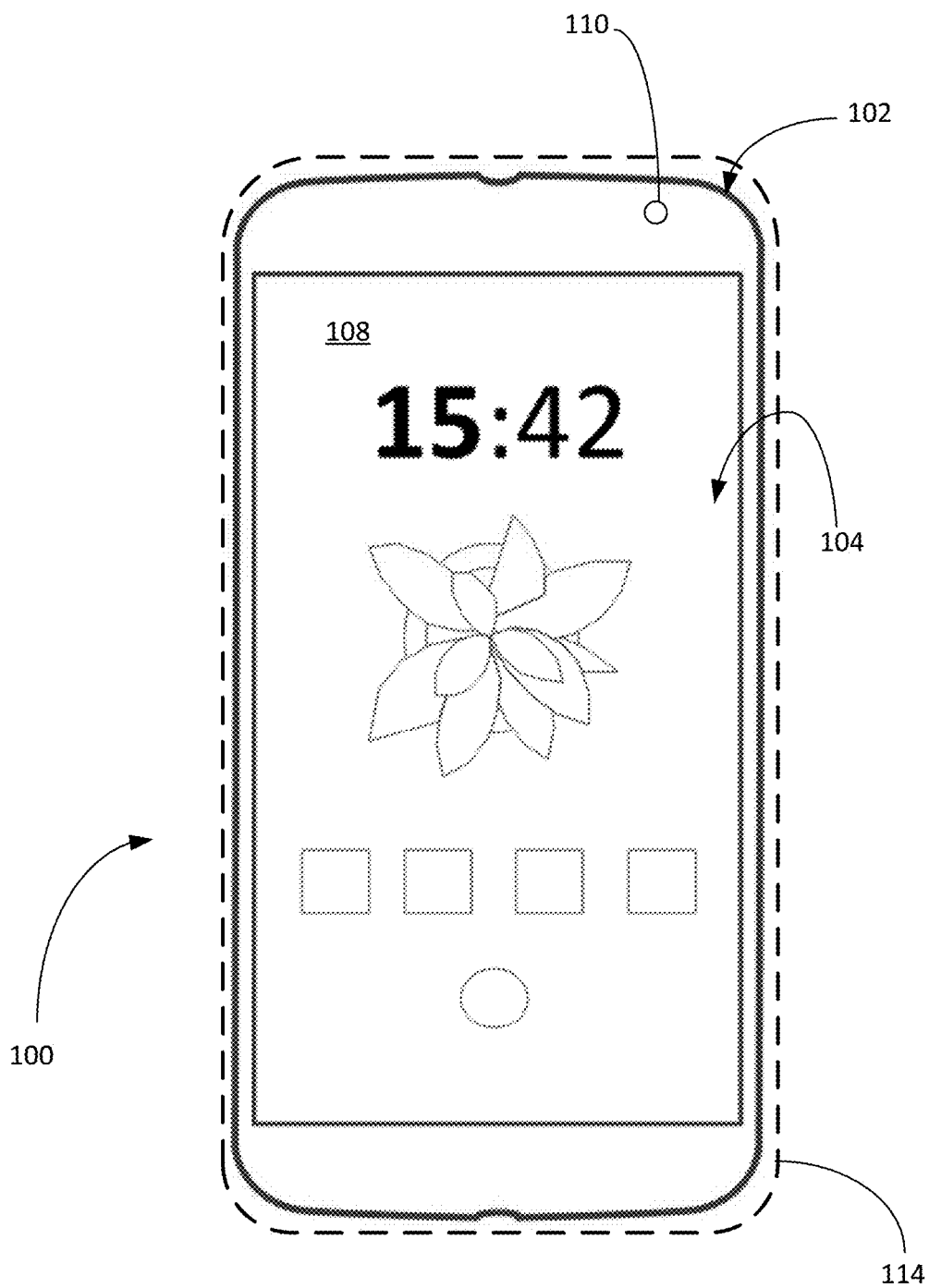
FIG. 1A is a front view of an electronic device, which is depicted as a mobile device in the drawing, according to an embodiment.
Figure 1B:
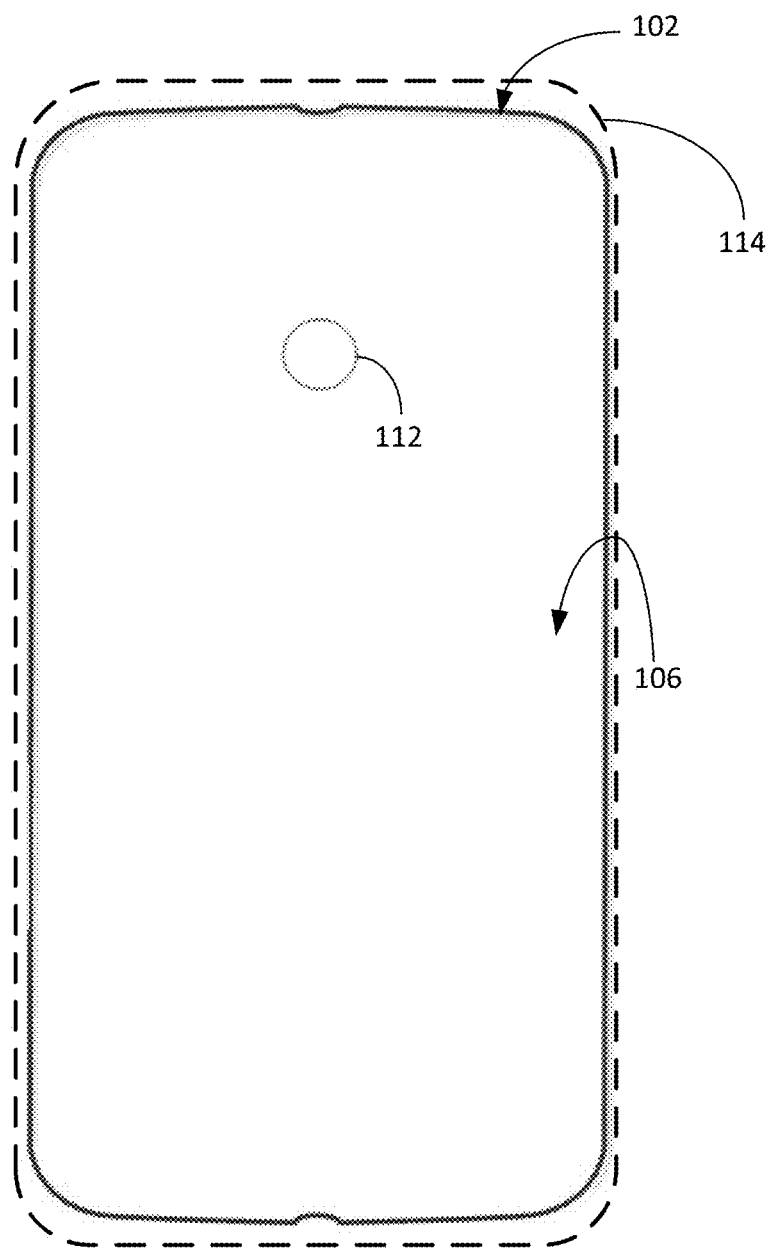
FIG. 1B is a rear view of the electronic device of FIG. 1A.

Turning to FIG. 1A and FIG. 1B, an embodiment of the electronic device, generally labeled 100, includes a housing 102 having a front side 104 and a rear side 106. Set within the front side 104 of the housing 102 is a display 108 and a first imager 110 (e.g., a front facing camera). Set within the rear side 106 of the housing 102 is a second imager 112 (e.g., a rear facing camera). Although depicted in FIG. 1 as a smartphone, the electronic device 100 may be implemented as other types of devices, including a tablet computer, portable gaming device, and a wearable device (e.g., a smart watch). In some embodiments, the housing 102 includes a ring 114 around its perimeter.

Figure 2:
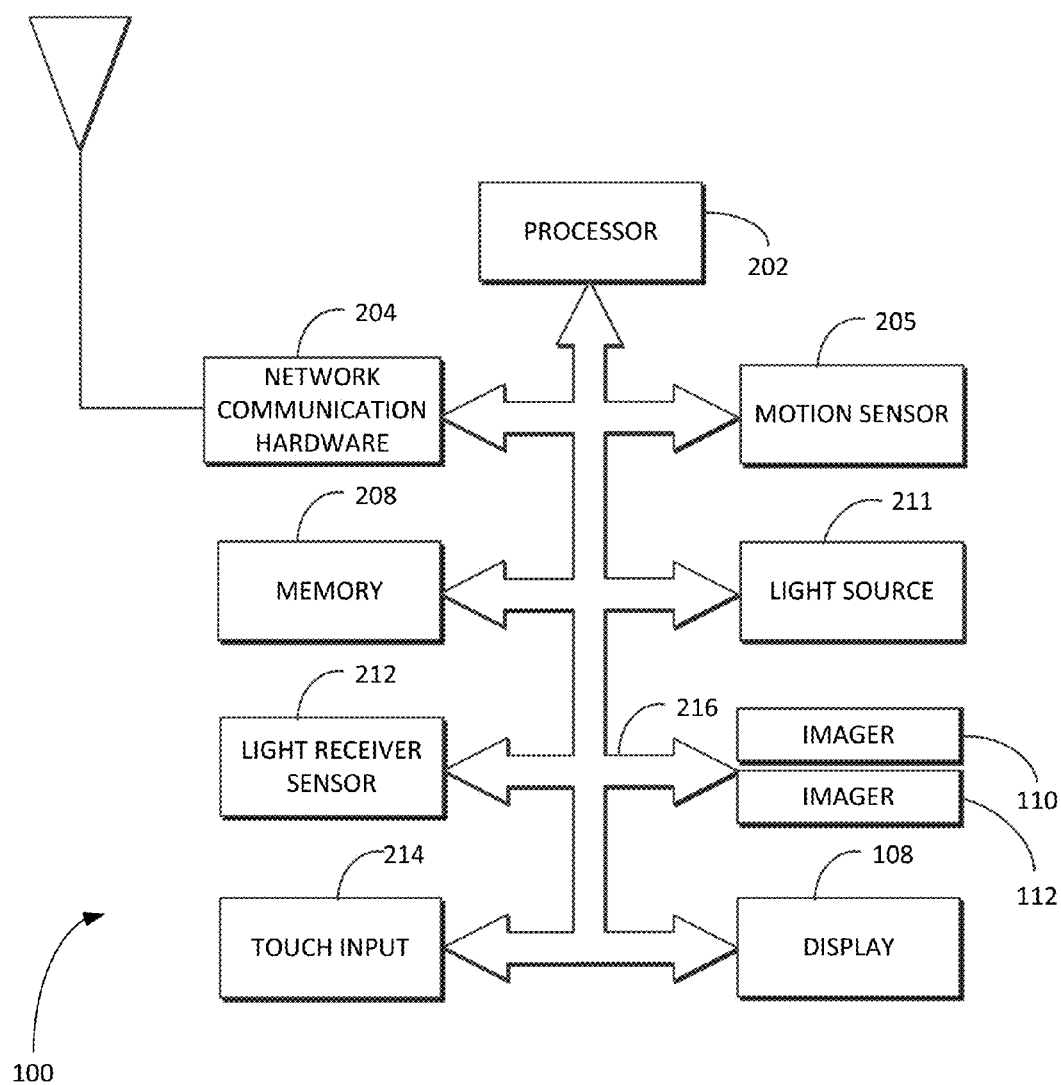
FIG. 2 is a block diagram that shows example components of the electronic device.

Turning to FIG. 2, an embodiment of the electronic device 100 also includes, within the housing 102, a processor 202, network communication hardware 204 (e.g., WiFi chip or a cellular baseband chipset), a motion sensor 205 (e.g., an accelerometer), a memory 208 (which can be implemented as volatile memory or non-volatile memory), a light source 211, a light receiver sensor 212, and a touch input 214 (e.g., a capacitive touch sensor integrated with the display 108). In an embodiment, the light source 211 is an infrared light-emitting diode that emits light with wavelengths of less than about 2 micrometers (between about 850 nanometers and about 950 nanometers in one embodiment), and the light receiver sensor 212 is an infrared sensor. Each of the elements of FIG. 2 is communicatively linked to one or more other elements via one or more data pathways 216. Possible implementations of the data pathways 216 include wires, conductive pathways on a microchip, and wireless connections. Possible implementations of the processor 202 include a microprocessor and a controller. In various embodiments, the processor 202 retrieves instructions and data from the memory 208 and, using the instructions and data, carries many of the methods described herein.

Figure 3:
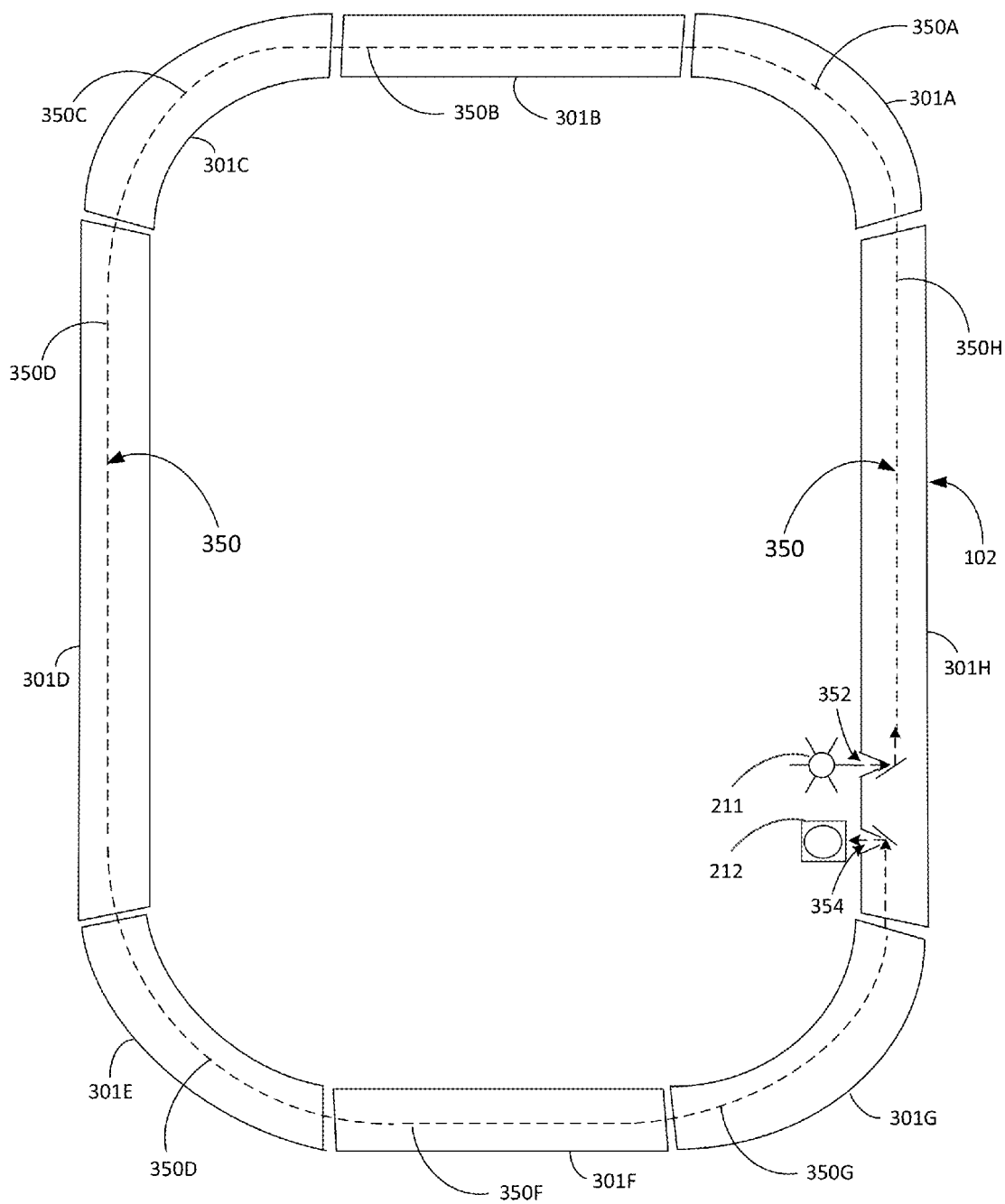
FIG. 3 is a block diagram showing a configuration of a light path through flexible portions of the housing of the electronic device according to an embodiment.

Turning to FIG. 3, the housing 102 (e.g., the ring 114 around the perimeter of the housing 102) includes one or more flexible portions 301 eight of which are illustrated (individually labeled 301A-301H). The light source 211 and the light receiver sensor 212 are disposed proximate to one of the portions (portion 301H in the illustrated embodiment). The light source 211 emits light, which enters the flexible portion 301H at an entry point 352, travels through the housing 102 on a path 350, exits the flexible portion 301H at an exit point 354, and strikes the light receiver sensor 212. In one embodiment, each flexible portion 301 acts as an optical waveguide. The path 350 may be defined by the material of the flexible portion 301 (which may be movable, be made of a pliant material, or be deformable) or may be defined by a separate structure, such as a light guide, waveguide, fiber optic strand, or tube. Each flexible portion 301 includes a portion of the path 350 (individual portions of the path are labeled 350A-350H). Each flexible portion 301 is configured to be flexed to alter the portion of the path passing through the separate flexible portion, thereby altering the overall path 350. When the path 350 is altered, the amount of light that is transmitted along the path 350 and that reaches the light receiver sensor 212 changes. When the amount of light reaching the light receiver sensor 212 changes, the signal produced by the light receiver sensor 212 represents this change by, for example, decreasing or increasing in strength commensurate with the decrease or increase in the amount of light reaching the light receiver sensor 212. When the processor 202 receives this signal from the light receiver sensor 212, the processor 202 reacts by initiating a function of the device 100.

The function that the processor 202 initiates may depend on the mode that the device 100 is in. For example, if the device 100 is not currently in a camera mode (e.g., is in a phone mode), then the processor 202 may react to the increase or decrease of light (e.g., resulting from external pressure by the user) by turning on the first imager 110 and placing the device 100 in a camera mode. As part of placing the device 100 into the camera mode, the processor 202 may launch a camera application that displays a camera viewer on the display 108. If the device 100 is already in a camera mode, then the processor 202 may react by controlling the first imager 110 to zoom in when the signal from the light receiver sensor 212 indicates that the path 350 is being restricted, and may react by controlling the first imager 110 to zoom out when the signal from the light receiver sensor 212 indicates that the path 350 is being unrestricted (the degree of restriction decreases). Alternatively, the reverse may be true (restricted=zoom out, unrestricted=zoom in). If the device 100 is determined to be motionless (i.e., the motion sensor 205 indicates to the processor 202 that the device 100 is motionless or indicates that the amount of motion falls below a predetermined threshold), and the processor 202 receives another signal from the light receiver sensor indicating a change (increase or decrease) in the amount of light, the processor 202 may react by controlling the first imager 110 to capture a still image.

According to an embodiment, the processor 202 may react based on how quickly the amount of light reaching the sensor 212 changes (either increases or decreases). For example, if a user quickly squeezes a flexible portion of the housing 102, then the amount of light that reaches the sensor 212 will quickly decrease. The sensor 212 will indicate the rate of this change by, for example, rapidly increasing or decreasing the strength of the signal it outputs. The processor 202 may react by, for example, controlling the first imager 110 to capture a still photograph.

In an embodiment, each flexible portion 301 of the housing 102 is a separate segment that defines a portion of the path 350. One or more of the segments may include surfaces off of which the light reflects at an angle after exiting the portion of the path 350 contained in that segment. These surfaces may include specific finishes that reflect the light at a certain angle or specific lensing that reflects the light at a certain angle.

Figure 4A:
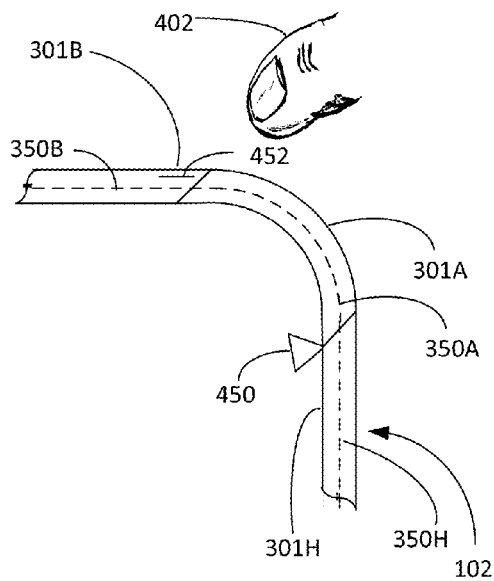
Figure 4B:
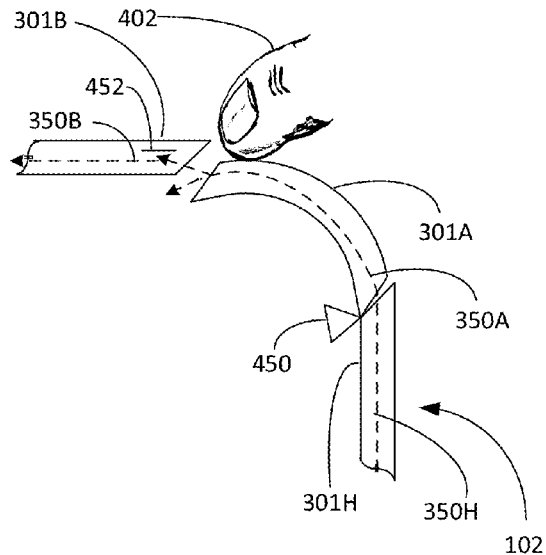

An example of how an embodiment operates will now be described with reference to FIG. 4A and FIG. 4B. In this example, the flexible portion 301A is a first segment, which defines a first portion 350A of the path 350, and the flexible portion 301B is a second segment, which defines a second portion 350B of the path 350. In one embodiment, the first portion 350A of the path 350 is a first portion of a waveguide and the second portion 350B of the path 350 is a second portion of the waveguide. In another embodiment, the first portion 350A of the path 350 is a first tube and the second portion 350B of the path 350 is a second tube. The first portion 301A is configured to flex relative to the rest of the housing 102 by pivoting on a structure 450 in response to external pressure (e.g., from a user's finger 402). This flexing action causes the first portion 350A of the path 350 to change from being aligned with the second portion 350B (FIG. 4A) to being misaligned with the second portion 350B (FIG. 4B), thereby altering the overall path 350 of the light so that only a portion of the light is able to travel from the first segment to the second segment.

According to an embodiment, the housing 102 includes multiple segments, in which some are flexible and some are rigid. For example, in FIG. 4A, the structures labeled 301A and 301B could be implemented as a first segment 301A and a second segment 301B, in which one segment is rigid and the other is flexible.

In an embodiment, the flexible portion 301B includes one or more surfaces (represented by surface 452) off of which the light reflects at an angle after the light exits the first portion 350A of the path 350. These surfaces may also be present if 301B was implemented as a rigid segment. Thus, when the first segment (flexible portion 301A) flexes with respect to the second segment (flexible portion 301B), this angle of reflection changes, thereby forcing the light to go in a specific direction, thereby reducing the amount of light passing from the first segment to the second segment. The surfaces may include specific finishing and lensing to accomplish this. The lensing may be included at the exit and entry of the path 350.

Figure 4C:
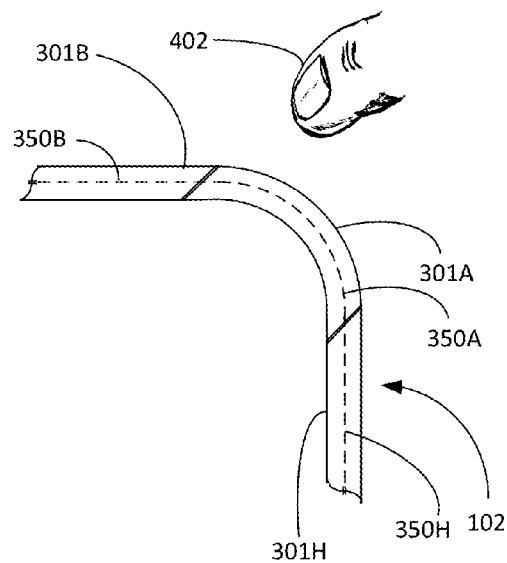
Figure 4D:
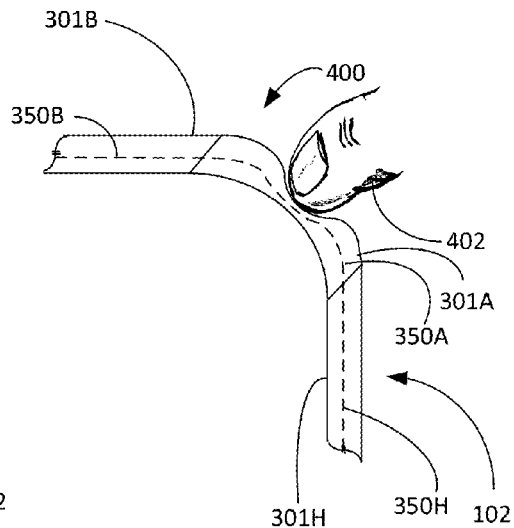

Another example of how an embodiment operates will now be described with reference to FIG. 4C and FIG. 4D. In this example, the flexible portion 301A is a first segment, which defines a first portion 350A of the path 350, and the flexible portion 301B is a second segment, which defines a second portion 350B of the path 350. The portion 301A is configured to flex—in this case, deform—response to external pressure (e.g., from a user's finger 402) thereby altering the path 350 of the light. More specifically, when the user squeezes the portion 301A, deformation caused by the pressure restricts the path 350 so that only a portion of the light is able to travel from the first segment to the second segment. When the user releases the portion 301A, the portion 301A returns to its original geometry, thereby unrestricting the path 350. In alternate embodiments, the portions of the housing 102 may be configured with blocking structures along the path 350 so that when the user squeezes the portion 301A, deformation caused by the pressure unblocks the path 350, and when the user releases the portion 301A, the portion 301A returns to its original geometry, thereby blocking the path 350.

According to an embodiment, different portions of the housing 102 have different degrees of influence over the amount of light that reaches the light receiver sensor 212 from the light source 211. For example, in FIG. 3, subjecting the portion 301A of the housing to external pressure might reduce the amount of light by 10%, while subjecting the portion 301C of the housing to external pressure might reduce the amount of light by 15% when subjected to external pressure. In this embodiment, the processor 202 carries out a function of the device 100 based on the amount of reduction in light detected by the light receiver sensor 212. For example, if the signal from the light receiver sensor 212 indicates to the processor 202 that the amount of light has been reduced by the first amount (e.g., 10%), then the processor 202 initiates a first function of the device 100 (e.g., a camera function), and if the signal from the light receiver sensor 212 indicates to the processor 202 that the amount of light has been reduced by the second amount (e.g., 15%), the processor 202 initiates a second function (e.g., a volume function).

Referring to FIG. 5, according to an embodiment, each flexible portion 301 of the housing 102 has a conduit 550 (individually labeled 550A-550H) that channels light from the light receiver sensor 211 through the flexible portion 301. The conduit may be implemented in a variety of ways, including a light-transmissible material (e.g., infrared light-transmissible material) and a hollow tube. The flexible portion 301 in this embodiment is configured to change the geometry or orientation of the conduit 550 (either within the flexible portion 301 itself or relative to other flexible portions) to alter the amount of light that reaches the light receiver sensor 212 from the light source 211 via the conduit 550. As with the previously-described embodiments, when the amount of light reaching the light receiver sensor 212 changes, the signal produced by the light receiver sensor 212 represents this change (e.g., a decrease or increase in current commensurate with the decrease or increase in the amount of light). When the processor 202 receives this signal from the light receiver sensor 212, the processor 202 reacts by initiating a function of the device 100.

Figure 6A:
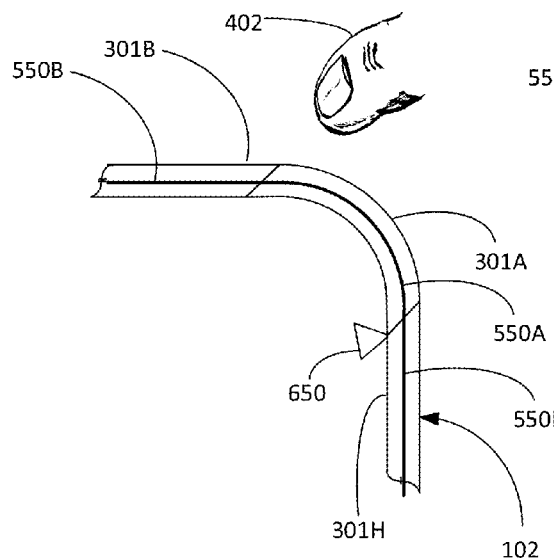
Figure 6B:
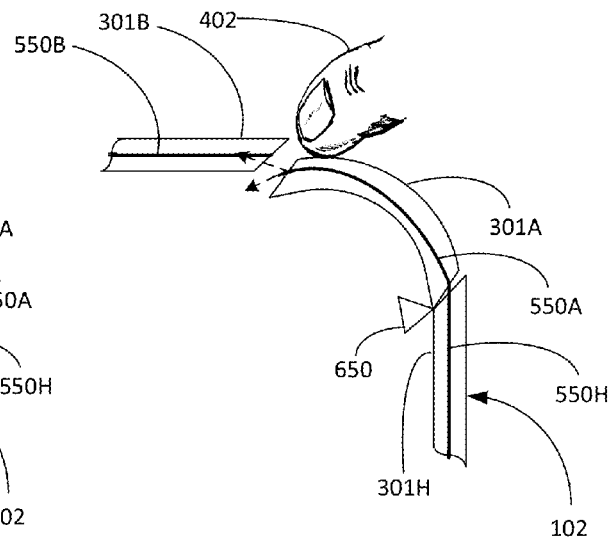

An example of how an embodiment operates will now be described with reference to FIG. 6A and FIG. 6B. In this example, the flexible portion 301A is a first segment, and has a conduit 550A that channels light through the first segment, and the flexible portion 301B is a second segment, and has a conduit 550B that channels light through the second segment. The first portion 301A is configured to flex relative to the rest of the housing 102 by pivoting on a structure 650 in response to external pressure (e.g., from a user's finger 402). This flexing action causes the conduit 550A of the first segment to change from being aligned with the conduit 550B of the second segment (FIG. 6A) to being misaligned with the conduit 550B of the second segment (FIG. 6B), thereby allowing only a portion of the light to travel from the first segment to the second segment. In alternate embodiments, the segments can include sub-segments to allow for multiple light paths. For example, one or more of the conduits 550 could include two waveguides. The additional waveguides could be used to communicate specific control signals.

Figure 6C:
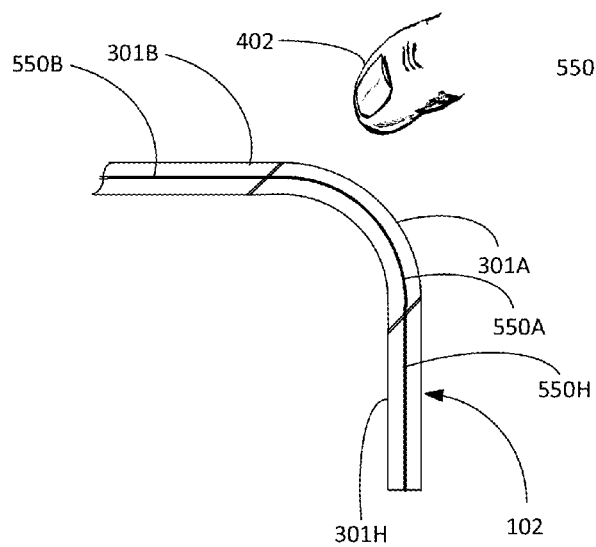
Figure 6D:
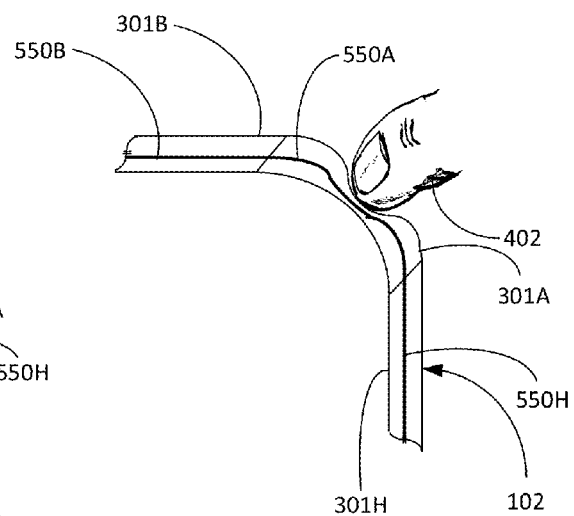

Another example of how an embodiment operates will now be described with reference to FIG. 6C and FIG. 6D. In this example, the flexible portion 301A is a first segment, which has a conduit 550A, and the flexible portion 301B is a second segment, which has a conduit 550B. The portion 301A is configured to flex—in this case, deform—response to external pressure (e.g., from a user's finger 402) thereby altering the geometry of the conduit 550A. More specifically, when the user squeezes the portion 301A, deformation caused by the pressure restricts the conduit 550A so that only a portion of the light is able to travel from the first segment to the second segment. When the user releases the portion 301A, the portion 301A returns to its original geometry, thereby permitting the conduit 550A to return to its original geometry and allow the full amount of light to pass.

In an embodiment, the conduits of different flexible portions of the housing 102 have different amounts of influence over the amount of light that reaches the light receiver sensor 212 from the light source 211. For example, referring to FIG. 5, in response to external pressure, a first segment (e.g., the portion 301A) might change the geometry of the conduit 550A to reduce the amount of light by a first amount (e.g., 10%) when subjected to external pressure, while a second segment (e.g., the portion 301C) might change the geometry of the conduit 550C to reduce the amount of light by a second amount (e.g., 15%) in response to external pressure. In this embodiment, the processor 202 carries out a function of the device 100 based on the amount of reduction in light detected by the light receiver sensor 212. For example, if the signal from the light receiver sensor 212 indicates to the processor 202 that the amount of light has been reduced by the first amount, then the processor 202 initiates a first function of the device 100 (e.g., a still camera function), and if the signal from the light receiver sensor 212 indicates to the processor 202 that the amount of light has been reduced by the second amount, the processor 202 initiates a second function (e.g., a volume function).

Referring to FIG. 7, in an embodiment, the electronic device 100 further includes a second light receiver sensor 212A. The second light receiver sensor 212A is positioned in the housing 102 in such a way that it can detect a change in the amount of light that passes through a particular flexible portion. For example, in FIG. 7 the flexible portion 301A is implemented as a first segment of the housing 102 and the flexible portion 301C is implemented as a second segment of the housing 102. The first segment (flexible portion 301A) is configured to change the geometry of its conduit 550A in response to external pressure on the first segment, which alters the amount of light that reaches the first sensor 212 via the conduit 550A. The second segment (flexible portion 301C) is configured to change the geometry of the conduit 550C in response to external pressure on the second segment, which alters the amount of light that reaches the second sensor 212A via the conduit 550C. The first light receiver sensor 212 is configured to produce a first signal in response to an alteration in the amount of light reaching it, and the second light receiver sensor 212A is configured to produce a second signal in response to an alteration in the amount of light reaching it. In this embodiment, the processor 202 is configured to initiate a first function of the device 100 in response to the first signal, and is configured to initiate a second function of the device 100 in response to the second signal. Alternatively, there may also be multiple light sources at different location in addition to the light receivers. For example, there could be a receiver at the beginning of 301A and light source at the end of 301A, and there could be a light receiver at the beginning of 301B and light source at the end of 301B.

Turning to FIG. 8, a procedure carried out on the electronic device 100 according to an embodiment begins at block 802, at which the light source 211 emits light on the path 350 through the housing 102. At block 804, the device 100 receives external pressure on the housing 102. At block 806, a portion of the housing (e.g., some portion of the ring 114) flexes in response to the pressure. At block 806, the portion of the housing that flexes (e.g., the flexible segment 301A) alters the path of the light in the process of flexing. At block 808, the processor 202 receives a signal from the light receiver sensor 212 that indicates a change in the amount of light transmitted along the path. At block 810, the processor reacts to the signal by carrying out a function of the device 100 (e.g., the camera functions described above) based on the mode of the device 100 and possibly based on the motion of the device.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments of the have been described with reference to the figures, it will be understood by those of ordinary skill in the art that various changes in form and details may be made therein without departing from their spirit and scope of as defined by the following claims.

We claim:

1. An electronic device comprising:
    a housing;
    a light source that emits light and is disposed within the housing,
    wherein at least a portion of the housing is configured to be flexed to alter a path of the light through the housing;
    a light receiver sensor disposed within the housing configured to produce a signal in response to the path; and
    a processor configured to receive the signal and initiate a function of the electronic device in response to the signal,
    wherein the function is based on a mode of the electronic device, and
    wherein if the electronic device is in a camera mode, the function is a zoom function.

2. The electronic device of claim 1, wherein if the electronic device is not in the camera mode, the function is a camera launch function.

3. The electronic device of claim 1, further comprising a motion sensor, wherein if the electronic device is in the camera mode and the motion sensor indicates that the motion of electronic device is below a predetermined threshold, the function is a still image capture function.

4. The electronic device of claim 1, wherein the mode is the camera mode and the processor is configured to control an imager to zoom in or zoom out based on whether the signal indicates that the path of the light is being restricted or unrestricted.

5. The electronic device of claim 1, wherein the mode is the camera mode and the processor is configured to control an imager to take a photograph when the signal indicates that the flow of light is being quickly restricted or unrestricted.

6. The electronic device of claim 1, wherein the light source is in infrared light source with wavelengths of less than about 2 micrometers.

7. An electronic device comprising:
    a housing;
    a light source that emits light and is disposed within the housing,
    wherein at least a portion of the housing is configured to be flexed to alter a path of the light through the housing;
    a light receiver sensor disposed within the housing configured to produce a signal in response to the path; and
    a processor configured to receive the signal and initiate a function of the electronic device in response to the signal,
    wherein the function is based on a mode of the electronic device, and
    wherein
    the housing comprises a first segment and a second segment,
    the first segment defines a first portion of the path,
    the second segment defines a second portion of the path,
    the first segment is configured to flex with respect to the second segment in response to the external pressure so as to misalign the first portion and the second portion, thereby altering the path of the light.

8. The electronic device of claim 7, wherein the first segment and the second segment each act as an optical waveguide.

9. The electronic device of claim 7, wherein
    the first portion of the path is a first tube,
    the second portion of the path is a second tube.

10. The electronic device of claim 7, wherein
    the first portion of the path is a first portion of a waveguide,
    the second portion of the path is a second portion of the waveguide.

11. The electronic device of claim 7, wherein
    the first segment defines a portion of a path through which the light flows through the housing,
    the second segment comprises a surface off of which the light reflects at an angle after exiting the path of the first segment,
    the first segment is configured to flex with respect to the second segment in response to the external pressure so as change the angle.

12. An electronic device comprising:
    a housing;
    a light source disposed within the housing;
    a light receiver sensor disposed within the housing,
    wherein the housing comprises a flexible portion having a conduit that channels light through the flexible portion,
    wherein the flexible portion is configured to, in response to external pressure on the flexible portion, change the geometry of the conduit to alter the amount of the light that reaches the light receiver sensor via the conduit,
    wherein the light receiver sensor is configured to produce a signal in response to an alteration in the amount of light reaching it; and
    a processor configured to receive the signal and initiate a function of the electronic device in response thereto,
    wherein
        the flexible portion is a first segment of the housing,
        the housing further comprises a second segment having a conduit that channels the light through the second segment,
        the first segment is configured to, in response to external pressure on the first segment, change the geometry of its conduit to reduce the amount of the light that reaches the light receiver sensor by a first amount,
        the second segment is configured to, in response to external pressure on the second segment, change the geometry of its conduit to reduce the amount of the light that reaches the light receiver sensor by a second amount, and
        the processor is further configured to
            initiate a first function of the electronic device in response to the signal indicating a reduction of the amount of light by the first amount,
            initiate a second function of the electronic device in response to the signal indicating a reduction of the amount of light by the second amount.

13. The electronic device of claim 12, further comprising a second light receiver sensor, wherein
- the conduit of the second segment channels the light through the second segment to the second light receiver sensor,
- the second segment is configured to, in response to external pressure on the second segment, change the geometry of its conduit to alter the amount of the light that reaches the second light receiver sensor,
- the second light receiver sensor is configured to produce a second signal in response to an alteration in the amount of light reaching it,
- the processor is further configured to initiate a second function of the electronic device in response to the second signal.

14. The electronic device of claim 12, wherein the light source is an infrared light source and the conduit comprises infrared transmissible material.

15. The electronic device of claim 12, wherein the conduit is a hollow tube.

* * * * *